United States Patent [19]

Jacobs

[11] Patent Number: 5,022,041
[45] Date of Patent: Jun. 4, 1991

[54] NEAR RESONANT ND$^{3+}$, SOLID STATE LASER SYSTEM

[75] Inventor: Ralph R. Jacobs, Fremont, Calif.

[73] Assignee: Spectra-Physics, San Jose, Calif.

[21] Appl. No.: 418,287

[22] Filed: Oct. 6, 1989

[51] Int. Cl.$^5$ ............................................ H01S 3/091
[52] U.S. Cl. ...................................... 372/70; 372/75; 372/95; 372/41; 372/99
[58] Field of Search ...................... 372/40, 41, 75, 101, 372/95, 69, 92, 70, 99

[56] References Cited

U.S. PATENT DOCUMENTS

| | | | |
|---|---|---|---|
| 3,711,787 | 1/1973 | Snitzer et al. | 372/40 |
| 3,719,901 | 3/1973 | Monchamp et al. | 372/41 |
| 3,825,500 | 7/1974 | Shaw et al. | 372/40 |
| 4,229,713 | 10/1980 | McCollum et al. | 372/41 |
| 4,681,396 | 7/1987 | Jones | 372/71 |
| 4,764,933 | 8/1988 | Kozlovsky et al. | 372/75 |
| 4,827,485 | 5/1989 | Scerbak et al. | 372/101 |

OTHER PUBLICATIONS

Rahn, Larry et al. "Diode Laser Pumped Nd:YAG Laser Injection Seeding System" Applied Optics vol. 25, No. 5 (Mar. 1986) pp. 629-633.
R. Beach et al., Ground State Depleted Laser Experiments, SPIE vol. 1040 High Power & Solid State Lasers II (1989) pp. 84-98.
W. I. Krupke et al., Ground State Depleted Solid State Lasers: Principles, Characteristics & Scaling, SPIE vol. 1040 High Power & Solid State Lasers II (1989), pp. 68-83.
H. Po, F. Hakimi et al. Neodymium Fiber Lasers at 0.905, 1.06, & 1.4 μm, abstract of 1986 Annual Meeting, Optical Society of America.
Tso Yee Fan et al., Modeling & CW Operation of a Quasi-Three-Level 946 nm Nd:YAG Laser, 0018-9197/87/0500-0605$01.00 ©1987 IEEE.
M. J. Weber, PhD., CRC Handbook of Laser Science & Technology, vol. I Laser & Masers, 1982, CRC Press, Inc.

Primary Examiner—Frank Gonzalez
Assistant Examiner—Susan S. Morse
Attorney, Agent, or Firm—Fliesler, Dubb, Meyer & Lovejoy

[57] ABSTRACT

A commercial near resonant laser system with a trivalent rate earth ion doped solid state host, such as Nd:YAG, is pumped at an energy sufficient to excite the electrons from the ground level directly to the upper laser level. The laser system is then tuned to a transition from the upper laser level back to the ground level to produce high power output beams. Because the ground level will include a plurality of "Stark split levels", the necessary population inversions can be maintained and laser energy generated. However, the difference between the Stark split level from which the electrons are excited to the upper laser level, and the Stark split level to which the electrons decay in the light producing transition from the upper laser level, is slight. Thus, energy dissipated in heat as electrons decay in non-lasing transitions is minimized.

15 Claims, 2 Drawing Sheets

NEAR RESONANT ND$^{3+}$, SOLID STATE LASER SYSTEM

BACKGROUND OF THE INVENTION

The present invention relates to solid state laser systems, and, more particularly, to laser systems with a gain medium Nd$^{3+}$ in a solid state host.

DESCRIPTION OF RELATED ART

Solid state laser systems consisting of trivalent rare earth ion doped solid state gain media according to the prior art are typically run as three level or four level lasers. For instance, Nd:YAG lasers of the prior art are typically run as either a four level laser in which electrons are excited from the ground level $^4I_{9/2}$ to a second excited electronic state above the $^4F_{3/2}$ electronic state. The electrons decay to the $^4F_{3/2}$ state which serves as the upper laser level. The laser system is tuned to oscillate at 1.06 microns from the upper laser level to the electronic state $^4I_{11/2}$. The energy difference between the $^4I_{11/2}$ level and the ground level is dissipated as heat in the gain medium. Also, any energy difference between the second excited electronic state and the upper laser level is dissipated as heat.

This is referred to as a four level laser system because the electrons are excited from the first ground level to a second electronic state above the upper laser level. The electrons then decay to a third electronic state at the upper laser level. From the upper laser level, the transition generating the laser beam occurs to a fourth electronic state which is above the ground level.

Nd:YAG systems have also been developed which operate as "three level" systems. These three level systems are typically diode pumped lasers, where the diodes are tuned to approximately 0.81 microns for pumping the gain medium. This causes excitement from the ground level directly to the upper laser level. From the upper laser level, the transition generating the laser light occurs down to the $^4I_{11/2}$. Thus, three electronic states are actively involved in the laser action. As the electrons decay from the $^4I_{11/2}$ state, heat is dissipated into the gain medium.

The waste heat in these four level or three level laser systems can be a very serious problem, particularly for commercial, high power systems. As heat accumulates, stress is induced in the gain medium along with thermally induced index of refraction changes which can cause distortion of the beam, or other problems.

Accordingly, it is desirable to operate a high power solid state laser, such as Nd:YAG, such that less energy is dissipated as heat in the solid state host of the gain medium.

SUMMARY OF THE INVENTION

The present invention provides a high power, near-resonant laser system for commercial applications with an Nd ion doped solid state host, such as Nd:YAG, with outputs larger than 100 milliwatts. In this system, the host is pumped at an energy sufficient to excite the electrons from the ground level directly to the upper laser level. The laser system is then tuned to a transition from the upper laser level back to the ground level. Because the ground level will include a plurality of "Stark split" levels, the necessary population inversions can be maintained and laser energy generated. However, the difference between the Stark split level from which the electrons are excited to the upper laser level, and the Stark split level to which the electrons decay in the light producing transition from the upper laser level, is slight. Thus, energy dissipated in heat as electrons decay in transitions other than the lasing transition is minimized.

Thus, the present invention can be characterized as comprising an Nd doped solid state medium with concentrations of Nd$^{3+}$ greater than $1 \times 10^{20}$ ions per cubic centimeter having a ground electronic state and an excited electronic state serving as an upper laser level. A pump energy source, such as a diode laser array, is coupled with the gain medium, for supplying pump energy at 0.1 to 10 kilowatts per centimeter at near the transition energy between the ground electronic state and the upper laser level, such that electrons in the ground electronic state are excited directly to the upper laser level. Optics are associated with the gain medium or the gain medium is injection seeded, to induce gain in the gain medium at a selected wavelength which corresponds to transitions from the upper laser level directly to the ground electronic state.

According to one aspect, the optics consist of a first selective reflecting mirror and an output coupler. The selective reflecting mirror has substantial reflectivity at the selected wavelength, while it transmits wavelengths generated by transitions from the upper laser level to other excited electronic states and at the laser diode pump wavelength of 0.81 microns for Nd:YAG.

According to yet another aspect, the gain medium is pumped by a diode array at 0.81 microns. The selected wavelength corresponds to transitions from the $^4F_{3/2}$ excited electronic state back to the ground state at $^4I_{9/2}$ state at approximately 0.93 microns with output power greater than 100 milliwatts.

It can be expected that the waste heat generated by the laser system according to the present invention will be between 5 and 10 times less than generated in a similar three level system.

Other aspects and advantages of the present invention can be seen upon review of the figures, the detailed description, and the claims which follow.

DETAILED DESCRIPTION

A detailed description of preferred embodiments of the present invention is described with reference to the figures.

Figure 1:
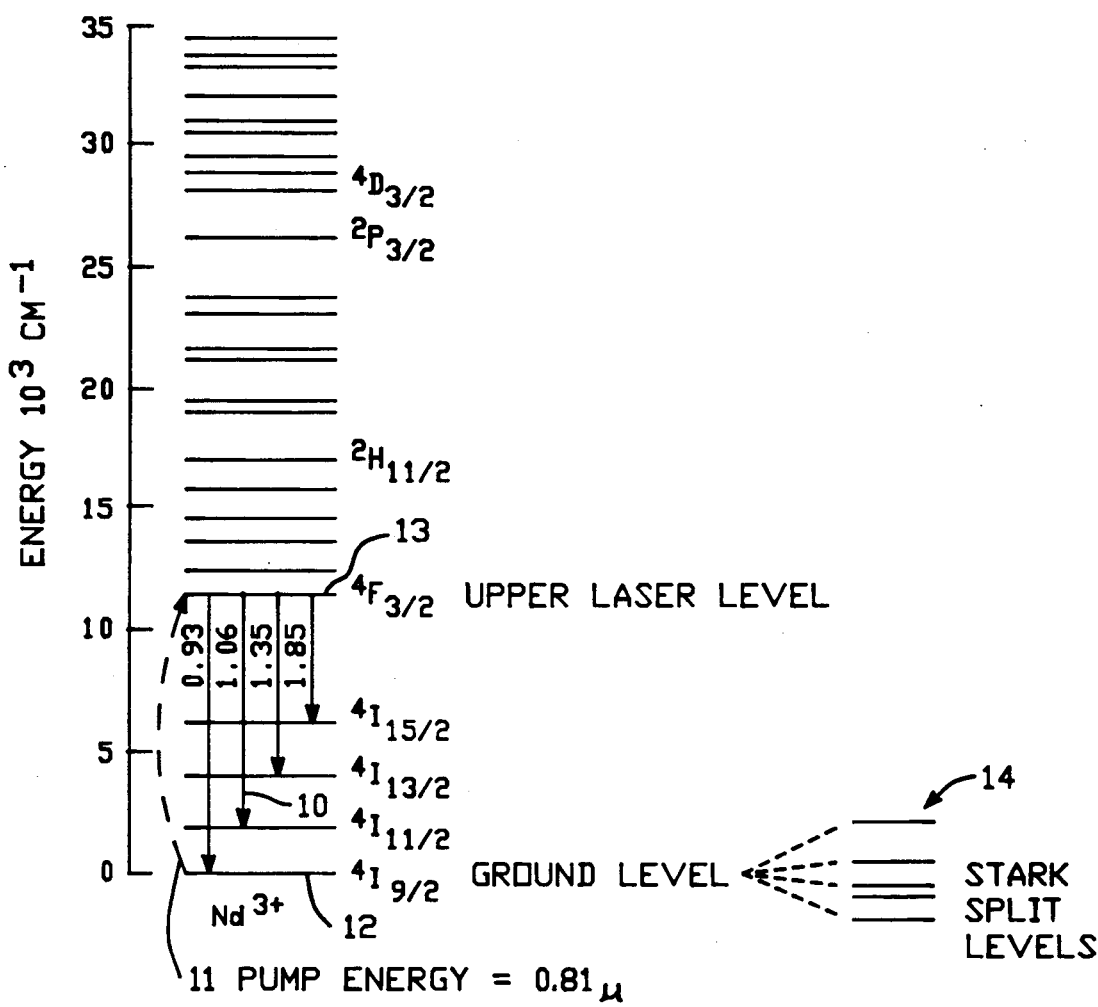
FIG. 1 is an energy level diagram for trivalent Nd illustrating the transitions for laser action according to the present invention.

FIG. 1 shows an energy level diagram for trivalent neodymium, Nd$^{3+}$. As can be seen, the element has a plurality of electronic states, including a ground level at $^4I_{9/2}$. The upper laser level for Nd is the $^4F_{3/2}$ state. The proven lasing transitions for Nd are shown as arrows from the upper laser level to a lower excited state. The most popular is the 1.06 micron transition 10. However, it can be seen that electrons in the 1.06 micron transition 10 decay to the $^4I_{11/2}$ electronic state. Electrons in this state then decay to the ground level and generate heat which is dissipated into the host crystal.

According to the present invention, the electrons are excited by a pump energy 11 at approximately 0.8 microns, which causes electrons in the ground level 12 to be excited to the upper laser level 13. The system is then tuned to inhibit gain at the 1.06 micron transition, the 1.35 micron transition and the 1.85 micron transition, and to promote gain at the 0.93 micron transition. Thus, the electrons decay directly to Stark split levels of the ground state 12 from the upper laser level 13. The population inversion required for lasing activity is possible because of the Stark split levels shown generally at reference numeral 14 of the ground level. Most electrons in the ground level will be in the lower Stark split levels, allowing transitions from the upper laser level 13 to the upper Stark split levels. The difference in energy from the upper Stark split levels to the lowers Stark split levels is substantially less than the difference in energy between other electronic states and the ground level 12.

Figure 2:
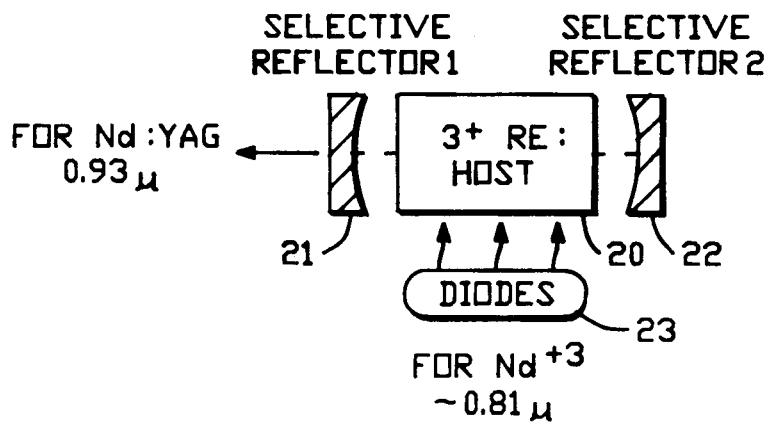
FIG. 2 is a schematic diagram of a laser system according to the present invention.

FIG. 2 shows a schematic diagram of a laser system with Nd:YAG medium with concentration greater than $1 \times 10^{20}$ ions per cubic centimeter, according to the present invention. A first selective reflector 21 and a second selective reflector 22 are mounted with the gain medium 20 to establish a resonant cavity. A diode laser array 23 is coupled with the gain medium 20 and tuned at approximately 0.81 microns for pumping electrons in the gain medium 20 directly to the upper laser level with energy density in the range for commercial applications of from 1 watt to 10 kilowatts per square centimeter.

The first and second selective reflectors 21, 22 are implemented using well known thin film dielectric coating techniques so that they are transmissive at 1.06 microns, 1.35 microns, and 1.85 microns, and therefore inhibit gain at those wavelengths. They are reflective at 0.93 microns, and therefore induce gain at the preferred transition. The selective reflector 21 also has some transmission at the wavelength of 0.93 microns of the preferred transition and serves as an output coupler.

Diode arrays that are tuned to 0.81 microns are commonly available in the industry and have been used in the past in "three level" Nd:YAG laser systems oscillating at 1.06 microns. In the system of FIG. 2, the pump power is in the neighborhood of 1 watt for outputs greater than 100 milliwatts.

Of course, the reflectors 21, 22 can be bonded to the end of the gain medium 20 or separated by some distance, as known in the art.

Figure 3:
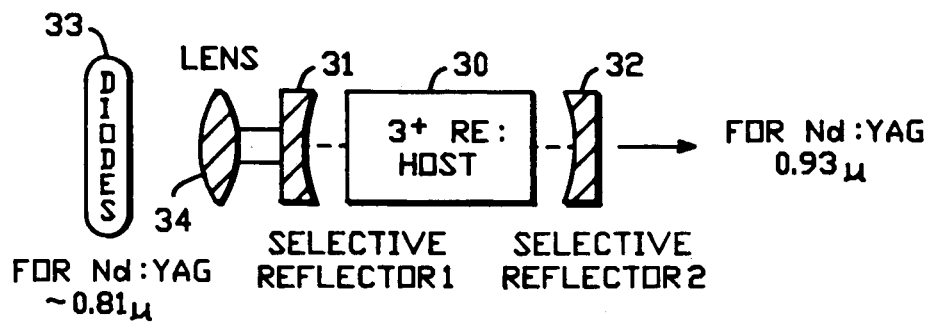
FIG. 3 is a schematic diagram of a longitudinally pumped laser system according to the present invention.

FIG. 3 shows an alternative embodiment of a laser system according to the present invention. Again, the gain medium 30 is Nd:YAG with a concentration of greater than $1 \times 10^{20}$ ions per cubic centimeter. A resonant cavity is formed around gain medium 30 by a first selective reflector 31 and a second selective reflector 32. Selective reflector 32 behaves as an output coupler with some transmission at 0.93 microns, and enough transmission at the wavelengths of other transitions of Nd to suppress gain at those wavelengths. The first selective reflector 31 is, in addition, transmissive at 0.81 microns so that the gain medium 30 can be longitudinally pumped.

Longitudinal pumping is achieved by a diode array 33 generating 0.81 microns output. Lens assembly 34 is coupled between the diode array 33 and selective reflector 31. Lens assembly 34 focuses the pumping radiation longitudinally through the host 30. The selective reflector 32 is also coated so that it is highly reflective at the wavelength of the pumping medium 0.81 microns. Thus, any pump energy which is passed through the gain medium 30 is reflected back for a second pass.

Figure 4:
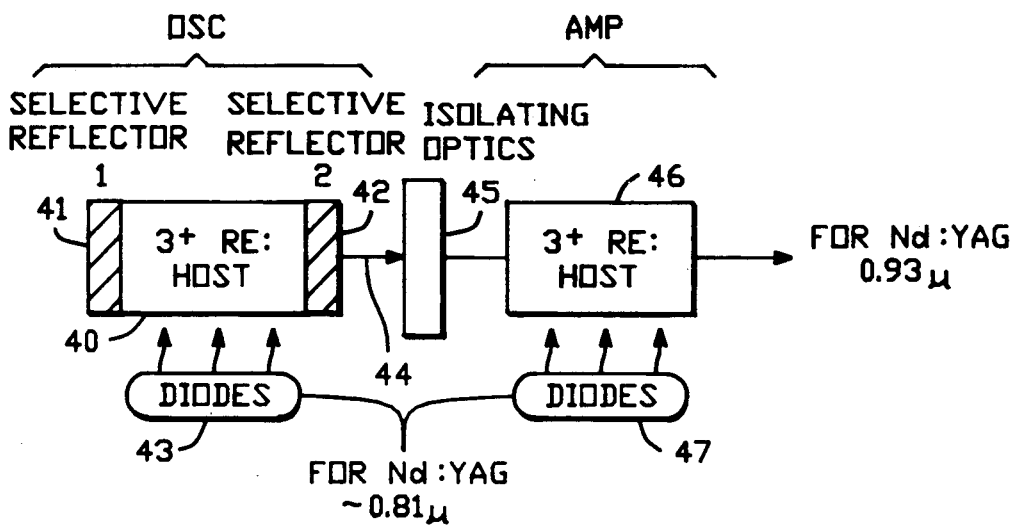
FIG. 4 is a schematic diagram of an oscillator/amplifier laser system according to the present invention.

FIG. 4 illustrates an oscillator/amplifier system according to the present invention. In this system, the oscillator consists of a solid state gain medium 40 (Nd:YAG) with selective reflectors 41 and 42 bonded to the ends of the gain medium 40. The gain medium is pumped with diode array 43 and tuned to 0.93 microns. A 0.93 micron output is generated along optical path 44 through isolating optical elements 45 into a second multipass amplifying gain medium 46 schematically shown with reflectors 48 and 49. The amplifying gain medium 46 is again Nd:YAG which is pumped by a diode array 47 at 0.81 microns. Thus, the gain medium 46 is injection seeded at 0.93 microns to induce gain at that wavelength.

A regenerative amplifier stage is shown in FIG. 4. Alternatively, a single pass amplifier or another configuration could be used.

Figure 5:
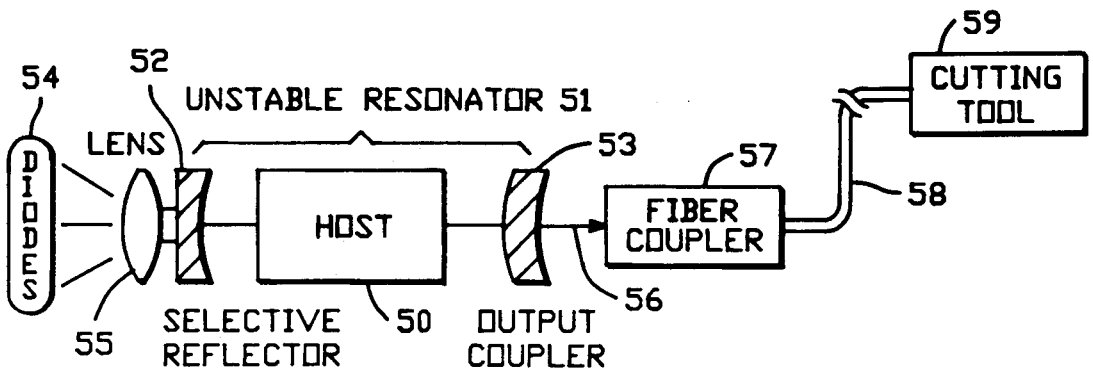
FIG. 5 is a schematic diagram of a laser having an unstable resonator according to the present invention.

FIG. 5 illustrates an unstable resonator implementation of the present invention. In this system, the oscillator consists of a host 50 mounted in an unstable resonator 51. The unstable resonator consists of a selective reflector 52 and an output coupler 53. The selective reflector 52 forms a back mirror for the resonator 51. The output coupler 53 is a graded reflectivity mirror or a dot mirror as known in the art.

The diode array 54, tuned to the wavelength of the transition directly from the ground level to the upper laser level, generates output which is focused through lens assembly 55 through the selective reflector 52 into the host 50. As in the other systems, the host 50 comprises Nd:YAG with diodes 54 tuned to approximately 0.81 microns. The output wavelength would be approximately 0.93 microns for Nd:YAG.

The output beam 56 of the unstable resonator 51 is coupled into a fiber coupling mechanism 57 and through a fiber optic cable 58 to a remote cutting tool 59. This illustrates a high power application of the high power output beam 56.

The cutting tool could be, for instance, a surgical implement, a drill, or semiconductor processing equipment.

Although Nd:YAG is disclosed as the preferred gain medium, the invention can be expanded to include any of a variety of solid state crystalline hosts. Hosts in which oscillation from the upper laser level to the ground level has been achieved with Nd doping are set out in the following table which is derived from the CRC HANDBOOK OF LASER SCIENCE AND TECHNOLOGY, Vol. 1, edited by Weber (1982), pages 80-96.

TABLE

| HOST | λ LASER | PUMP MEDIUM |
|---|---|---|
| $CaWO_4$ | 0.9145 μm | Xe lamp/pulsed |
| $CaY_2Mg_2Ge_3O_{12}$ | 0.941 | Ar laser/ CW |
| $KY(WO_4)_2$ | 0.9137 | Xe lamp/pulsed |
| $Lu_3Al_5O_{12}$ | 0.9473 | Xe lamp/pulsed |
| $YAlO_3$ | 0.930 | Xe laser/pulsed |
| | 0.8910 | Ar laser/pulsed |
| $Y_3Al_5O_{12}$ | 0.8999 | |
| | 0.9385 | |

| TABLE -continued | | |
|---|---|---|
| HOST | λ LASER | PUMP MEDIUM |
| | 0.9460 | |

The pumping in the preferred system is done with diode arrays or diode lasers tuned to the resonant absorption wavelengths. Other pumping systems, such as LEDs, or tunable dye lasers could be used.

The lasers implemented according to the present invention generate output powers which are suitable for use in such applications as drills or scalpels or cutting machines, such as are used in ophthalmological surgical applications, semiconductor processing, or other high power applications, such as display and projection systems. These systems generate output powers greater than 100 milliwatts for pump powers in the watt range or of up to 10 kilowatts per square centimeter pump intensity. Further, power outputs of these devices can reach into the hundreds of watt range to kilowatts.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for amplifying light, comprising:
a gain medium comprising $Nd^{3+}$ ion doped host with a concentration greater than $1 \times 10^{20}$ ions per cubic centimeter having a ground electronic state an excited electronic state serving as an upper laser level, the ground electronic state and the upper laser level being separated by a transition energy;
pump means, coupled with the gain medium, for supplying pump energy tuned to near the transition energy such that electrons in the ground electronic state are excited directly to the upper laser level; and
means, coupled with the gain medium, for inducing gain in the gain medium at a selected wavelength corresponding to transitions from the upper laser level to the ground electronic state, to produce light with power greater than 100 milliwatts.

2. The apparatus of claim 1, wherein the means for inducing comprises means for injection seeding the gain medium.

3. The apparatus of claim 1, wherein the means for inducing comprises a resonant cavity, mounted with the gain medium, and tuned to the selected wavelength, and including means for abstracting greater than 100 milliwatts power from the resonant cavity at the selected wavelength.

4. The apparatus of claim 1, wherein the pump means is tuned to a pump wavelength near 0.9 microns, and the selected wavelength is near to but greater than 0.9 microns.

5. The apparatus of claim 1, wherein the pump means is tuned to approximately 0.81 microns, and the selected wavelength is near 0.9 microns.

6. The apparatus of claim 2, further including means for guiding the light through the gain medium in multiple passes.

7. The apparatus of claim 1, wherein the pump intensity is less than 10 kilowatts per square centimeter.

8. The system of claim 1, further including a fiber optic delivery apparatus coupled to receive the output beam and deliver the beam to a remote tool.

9. A laser system comprising:
a gain medium comprising an $Nd^{3+}$ ion doped host with a concentration greater than $1 \times 10^{20}$ ions per cubic centimeters having a ground electronic state and a plurality of excited electronic states, one of the plurality of excited electronic states serving as an upper laser level, the ground electronic state and the upper laser level being separated by a transition energy;
pump means, coupled with the gain medium, for supplying pump energy tuned to near the transition energy such that electrons in the ground electronic state are excited directly to the upper laser level;
selective reflecting means, mounted with the gain medium, having substantial reflectivity at a selected wavelength near the transition energy and transmitting wavelengths generated by transitions from the upper laser level to other excited electronic states; and
output coupling means, mounted with the gain medium to establish a resonant cavity with the selective reflecting means, having partial transmission at the selected wavelength to produce an output beam having power greater than 100 milliwatts.

10. The laser system of claim 9, wherein the pump means is tuned to a pump wavelength near 0.9 microns, and the selected wavelength is greater than but near 0.9 microns.

11. The laser system of claim 9, wherein the pump means is tuned to approximately 0.81 microns, and the selected wavelength is near 0.9 microns.

12. The laser system of claim 9, wherein the pump means is tuned to approximately 0.81 microns, and the selected wavelength is near 0.9 microns, and wherein the first selective reflecting means is transmissive at 0.81 microns and the pump means further includes means for focussing the pump energy through the first selective reflecting means longitudinally to the gain medium.

13. The system of claim 9, wherein the selective reflecting means and the output coupling means define an unstable resonant cavity.

14. The system of claim 9, further including a fiber optic delivery apparatus coupled to receive the output beam and deliver the beam to a remote tool.

15. The apparatus of claim 9, wherein the pump intensity is less than 10 kilowatts per square centimeter.

* * * * *